United States Patent [19]

Kurisu et al.

[11] Patent Number: 5,300,558
[45] Date of Patent: Apr. 5, 1994

[54] CURABLE RESIN COATING COMPOSITION

[75] Inventors: Masayoshi Kurisu, Chiba; Koji Utaka, Tokyo; Hajime Inagaki; Suguru Tokita, both of Yamaguchi; Kazuyuki Miyamoto; Yukari Hattori, both of Chiba; Noriyuki Murakoshi; Tsutomu Saito, both of Tokyo, all of Japan

[73] Assignee: Mitsui Petrochemical Industries, Ltd., Tokyo, Japan

[21] Appl. No.: 863,715

[22] Filed: Apr. 3, 1992

[30] Foreign Application Priority Data

Apr. 5, 1991 [JP] Japan .................. 3-73059
Sep. 13, 1991 [JP] Japan .................. 3-234725
Sep. 24, 1991 [JP] Japan .................. 3-243787

[51] Int. Cl.$^5$ .......... C08K 5/04; C08K 5/05; C08K 5/32; C08K 5/52
[52] U.S. Cl. .................. 524/707; 524/710; 524/712; 524/765; 524/766; 524/768
[58] Field of Search .......... 524/136, 139, 710, 140, 524/141, 707, 712, 765, 766, 768

[56] References Cited

U.S. PATENT DOCUMENTS 4,426,487 1/1984 König et al. .................. 524/710
4,699,964 10/1987 Kato et al. .................. 524/710 X
4,916,176 4/1990 Vachlas et al. .................. 524/140

FOREIGN PATENT DOCUMENTS 0012949 7/1980 European Pat. Off. .
0143992 6/1985 European Pat. Off. .
0144705 6/1985 European Pat. Off. .
0321704 6/1989 European Pat. Off. .

*Primary Examiner*—Judy M. Reddick
*Attorney, Agent, or Firm*—Birch, Stewart, Kolasch & Birch

[57] ABSTRACT

A curable resin composition comprising:
(A) a compound having at least one curable acrylic radical, methacrylic radical or vinyl radial, or a mixture thereof;
(B) an organic solvent containing an alcoholic organic solvent with an amount of not less than 40% by weight;
(C) a compound having at least one pentavalent P with phosphoryl bonding; and
(D) a polymerization initiator which when coated on the surface of molded inorganic or organic materials, the coating shows superiority in curing under atmosphere and the cured composition has excellent adhesion, surface hardness, resistance to scratch, resistance to abrasion, surface luster, transparency and antistatic property.

4 Claims, 2 Drawing Sheets

CURABLE RESIN COATING COMPOSITION

FIELD OF THE INVENTION

The present invention relates to curable resin compositions for coating of surfaces of inorganic materials such as glass, polymer materials like polymethylmethacrylate, polycarbonate, polyolefin, etc., and specifically relates to compositions capable of exhibiting enhanced adherence, without heat treatments to molded resin articles, and superior antistatic properties.

The present invention further relates to information recording media including disk media like optical disks, opto-magnetic disks, etc. and card media like optical cards, and specifically relates to those having on at least one side of the surfaces a coating of the resin composition of the present invention.

BACKGROUND OF THE INVENTION

Usually, molded materials made of polyolefins like polyethylene, polypropylene, polymers like polymethylmethacrylate, polycarbonate, etc. are not only lighter in weight and superior in resistance to impact in comparison with materials made of metal, glass, etc. but also have various advantages as being inexpensive and easily fabricated. Accordingly, they are used widely in many fields of motorcars, motorcycles, domestic electrical goods, general merchandise, etc. in place of those materials. However, these molded polymers are, when compared with metals or glass, not as high in surface hardness and not so resistant to scratch and abrasion such that they are defective in being susceptible to scratches on the surface. For example, since molded polymers are apt to be damaged on the surface by contacting, colliding, scratching, etc. during their transportation, usages, fixation of parts thereon, etc., molded polymers are limited in their application due to the defect in surface characteristics.

For the purpose of obviating the above mentioned defects of molded polymers, various methods have been proposed, and most of the methods are coating surfaces of molded polymers with layers of film composed of crosslinked curable resins. Among the film forming elements, proposed resins or resin forming components include silicone monomers or their compositions with various polymers, resin compositions of methylolmelamine with hardening components, and compositions of polyfunctional acrylic carbonic acid ester derivatives or their compositions with other polymer components.

Among the various polymer materials indicated above, with respect to the polyolefins, when a coated layer composed of a film forming element is formed on the surface of a molded polyolefin like polyethylene, polypropylene, etc., the coated molded material has a defect of having a coated layer readily peelable due to the poor adherence between the coated layer and polyolefin substrate. Methods for obviating the defects on the surface of molded polyolefin include surface treatments with corona discharging, coating with primers, etc. However, the surface treatment hardly improves the adhesion between the polyolefin substrate and the coated film composed of curable resins to the extent of being responsive to practical use. Among the above mentioned film forming elements, silicone film forming elements are expensive and are not preferred economically.

Among the aforesaid film forming elements, various types of compounds belonging to polyfunctional acrylic carbonic acid ester derivatives are proposed. For example, such types of compounds as poly(meth)acrylates of alkanepolyols, poly (meth)acrylates of polyoxyalkyleneglycols, poly (meth)acrylates of aromatic (phenolic) polyhydroxyl compounds, etc. are proposed for usage in film forming elements. In this specification, acrylates and methacrylates represent (meth)acrylates in the abbreviation form and hereinafter the same abbreviations are used. When coated films are formed on molded polyolefin substrates by the sole use of these polyfunctional acrylic carbonic acid ester derivatives as film forming elements, the coated resin shows shortcomings in the curing characteristics including the curing speed of the coated resin under atmosphere, and in the cured film properties including surface hardness, resistance to scratching, resistance to abrasion, flexibility, surface luster, resistance to heat, resistance to water, resistance to solvent, resistance to weathering, adhesion to substrate, etc., which made the coated film unsatisfactory for practical industrial usage. Combinations of more than two kinds of compounds belonging to the film forming element were put to the test to obviate these defects, however, the trial created new difficulties in coating surfaces of polyolefin substrates, though the drawbacks of sole use were remedied to some extent.

In these years, in accordance with the progress of informative society, need for large volume information recording media has increased. Optical recording media (opto-magnetic recording media) possess the advantages of being able to rewrite data, a large capacity, portable, capable of non-contact reading out and resistant to scratch or dust. Accordingly, applications of optical recording media have being expanded not only in auxiliary memories of computers but also in memories for various communication equipment like telephones, facsimiles, etc. as well as media for audio equipment. Previously, the opto-magnetic recording had a disadvantage of being unable to overwrite, and for this purpose of overcoming the defect, so called magnetic modulation recording has become widely employed recently in which the magnetic field for recording is reversed in conformity with recording signals during the recording. In the case of conducting a high frequency recording with the recording method, the floating head system is employed so as a magnet head will be able to follow the vibrating surface of the medium rotating in high speed.

As for the motion of a floating type head, the head is in a floating state while the medium keeps rotating, but is in a state of contact with the medium while the medium is stopped or at the start of rotation, and the phenomenon is referred to as CSS (Contact Start and Stop). Under the CSS motion, friction between the medium and head is produced, and repeated friction has a possibility of causing breakdown of medium or breaking of head (head-crush), which deteriorates the credibility of equipment so remarkably. Accordingly, magnetic heads and recording media being resistant to friction at Contact Start and Stop (CSS resistant) are required, and surface coatings for recording media are especially desired to be superior in resistant to friction.

For satisfying the requests, various methods of coating with crosslinking curable type resin information recording media like opto-magnetic media, on the surface of recording layer (over-coat) or the surface opposite to recording layer (top-coat), have been proposed.

For top-coats on the surface opposite to recording layer of information recording media, superior antistatic characteristics are requested in addition to the above-mentioned properties for coated film. It has been known that an addition of surface active agents to a resin composition mainly composed of polyfunctional acrylic monomers increases the antistatic effects. However, since those surfactants added heretofore show tendency of coming out as a resinous liquid on the surface of cured resin as known as bleed out, they are not suitable for usage in top-coats of optical disks, etc. Further, satisfactory antistatic property causes such problems as opaqueness of coated films and decrease in adhesion to substrates.

Surface coatings highly resistant to abrasion used for over-coats or top-coats of information recording media are generally hard and inferior in adhesion to other layers. Especially, since opto-magnetic disks contain reflecting layers composed of metal like aluminum, nickel alloys, etc., or thermoconductive layers composed of aluminum alloys, etc., adhesion between these metallic layers and the abrasion resistant surface coating is an important problem.

SUMMARY OF THE INVENTION

It is an object of the present invention to solve problems of the aforementioned prior art, and to provide curable resin compositions for coating which are superior in curing under atmosphere, adhering to molded resins, have satisfactory adhesion without heat treatments, and supply surface hardness, resistance to scratch, resistance to abrasion, surface luster, transparency and antistatic properties.

Another object of the present invention is to solve problems of the aforementioned prior art, and to provide information recording media which is superior in adhering to formed resins or metals, have satisfactory adhesion without heat treatments, and supply surface hardness, resistance to scratch, antistatic properties and resistance to CSS.

A further object of the present invention is to provide information recording media having a top-coat superior in antistatic properties.

Still a further object of the present invention is to provide information recording media having a surface layer superior in the above mentioned properties as well as having an inner layer superior in adhesion to the surface layer and to another layer.

The present invention provides a curable coating resin composition comprising;
(A) a compound having at least one polymerizable acrylic radical, methacrylic radical or vinyl radical, or a mixture thereof;
(B) an organic solvent containing an alcoholic organic solvent with an amount not less than 40% of the weight of organic solvent;
(C) a compound having at least one pentavalent P atom with phosphoryl bonding; and
(D) a polymerization initiator.

A preferred curable coating resin composition contains per 100 parts by weight of compound (A) having at least one polymerizable acrylic radical, methacrylic radical or vinyl radical, or a mixture thereof; 5~1500 parts by weight of organic solvent (B); 0.005~25 parts by weight of compound (C) having at least one hexavalent P atom; and 0.01~20 parts by weight of polymerization initiator (D).

The present invention provides information recording media having a recording portion and/or a reproducing portion on a substrate, and at least one outer surface being coated with the curable coating resin composition mentioned above.

The information recording medium may be a magnetic disk, or an optical disk capable of recording with laser light, or an opto-magnetic disk capable of rewriting with magnetic signals from a floated magnetic head while the recording portion and/or a reproducing portion is irradiated with continuous light.

Preferably, the substrate is a disk made of a metal, glass or plastics material.

The optical recording medium may be capable of reversing the direction of applied magnetic field in accordance with recording signals during recording.

DETAILED DESCRIPTION OF THE INVENTION

Figure 1:
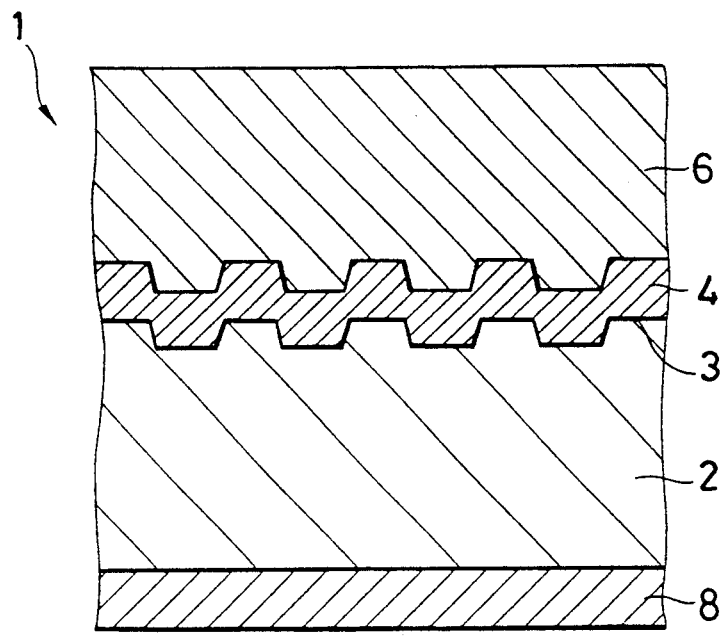
FIG. 1, FIG. 2, FIG. 3 and FIG. 4 are schematic diagrams showing various constructions of optical disks.

The present invention will be described in detail hereunder.

As to the compound (A) used for compositions of the present invention having at least one polymerizable acrylic radical, methacrylic radical or vinyl radical or a mixture thereof, the compound is exemplified by polyalkylene glycol (meth)acrylates like urethane (meth)acrylates, epoxy (meth)acrylates, diethylene glycol di(meth)acrylate, triethylene glycol di(meth)acrylate; ethylene oxide-modified bisphenol-A di(meth)acrylates like ethylene oxide-modified bisphenol-A di(meth)acrylates; compounds of alcohols with (meth)acrylic acid like pentaerythritol tetra(meth)acrylate, trimethylol propane tri(meth)acrylate, neopentyl glycol di(meth)acrylate; and vinyl compounds like N-vinyl pyrrolidone, N-vinylcaprolactam, triallyl isocyanulate. These compounds may be used in mixtures of more than two kinds.

As to the alcoholic organic solvent (B) used for compositions of the present invention, the solvent is exemplified by methanol, propanol, butanol, isobutylalcohol, isopentylalcohol, hexanol, diacetonealcohol, 2-methoxy ethanol and 2-ethoxy ethanol. These alcohols may be used in mixtures of more than two kinds. The alcoholic solvent may be mixed with other organic solvents. These organic solvents other than alcoholic and capable of mixing therewith are exemplified by hydrocarbons like benzene, toluene, xylene, cumene, hexane, ethylbenzene, heptane, octane, petroleum ether, ligroin, cyclohexane, methyl cyclohexane; halogenated hydrocarbons like methylene chloride, chloroform, carbon tetrachloride, bromoform, trichlene, ethylene dichloride, perchlene, ethane trichloride, tetrachloro ethane, propylene dichloride, chlorobenzene, bromobenzene; ketones like acetone, methyl ethyl ketone, methyl isobutyl ketone; and esters like methyl formate, ethyl formate, methyl acetate, ethyl acetate, propyl acetate, isobutyl acetate, butyl acetate, benzyl acetate, methyl benzoate, ethyl benzoate. These organic solvents may be used in mixtures of more than two kinds.

The amount of the organic solvent (B) is 5~1500, preferably 10~1000 parts by weight per 100 parts by weight of the component (A).

In the organic solvent, an alcoholic organic solvent is contained preferably 40% by weight or more, more preferably 60% by weight or more.

The reason is that an organic solvent containing 40% by weight or more of alcoholic solvent offers prevention from corrosion of materials like polycarbonate, poly(meth)acrylates, polyolefins to be coated with the resin compositions of the present invention, prevents the surface from turning opaque and generating cracks to supply satisfactory films.

A compound used for the present invention having in the molecule at least one pentavalent P with a bonding (phosphoryl bonding) represented by the following formula (1) is exemplified by the following formula (2)

$$-\overset{|}{\underset{|}{P}}=O \quad (1)$$

$$RO-\overset{O}{\underset{OR^2}{\overset{\|}{P}}}\overset{OR^1}{} \quad (2)$$

in which R, $R^1$ and $R^2$ can be H, $C_1$–$C_{24}$, optionally branched, alkyl radical, aryl radical, aralkyl radical or oxyalkylene radical, with the provision that at least one from R, $R^1$ and $R^2$ is not H.

When R, $R^1$ or $R^2$ is H, the compound having formula (2) may form a salt with an amino compound containing in the molecule at least one primary amino group, secondary amino group or tertiary amino group.

The compound represented by formula (2) may further contain in the molecule at least one polymerizable unsaturated group.

Those amino compounds contain preferably $C_1$–$C_{20}$, optionally branched, alkyl radical, aryl radical, oxyalkylene radical, (meth)acryloyl alkylene radical and (meth)acryloyloxy alkylene radical, and secondary and tertiary amines are specifically preferred.

These compounds represented by formula (2) are exemplified by the following, in which $R^3$ denotes H or $CH_3$.

$(CH_3O)_2\overset{O}{\overset{\|}{P}}OH$     dimethyl phosphate

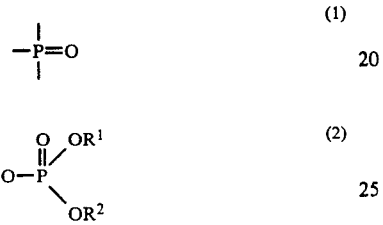
diisopropyl phosphate $(C_4H_9O)_2\overset{O}{\overset{\|}{P}}OH$     dibutyl phosphate $C_4H_9O-\overset{O}{\overset{\|}{P}}(OH)_2$     monobutyl phosphate $(C_8H_{17}O)_2\overset{O}{\overset{\|}{P}}OH$     2-ethylhexyl acidphosphate (dioctyl phosphate)

$(C_{10}H_{21}O)_2\overset{O}{\overset{\|}{P}}OH$     isodecyl acidphosphate

-continued

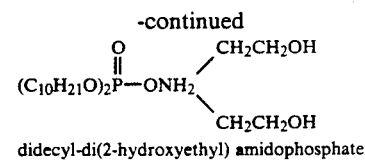
didecyl-di(2-hydroxyethyl) amidophosphate

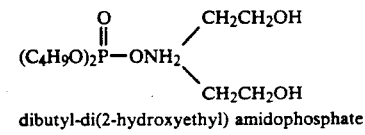
dibutyl-di(2-hydroxyethyl) amidophosphate

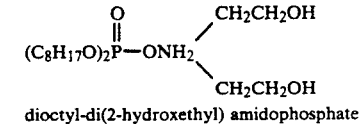
dioctyl-di(2-hydroxyethyl) amidophosphate

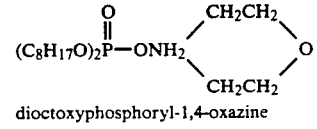
dioctoxyphosphoryl-1,4-oxazine

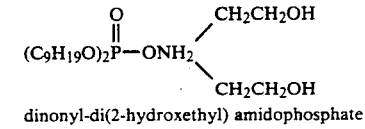
dinonyl-di(2-hydroxyethyl) amidophosphate

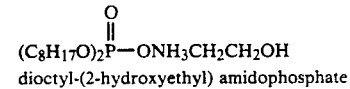
dioctyl-(2-hydroxyethyl) amidophosphate

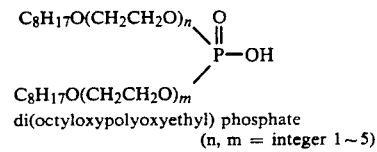
di(octyloxypolyoxyethyl) phosphate
(n, m = integer 1~5)

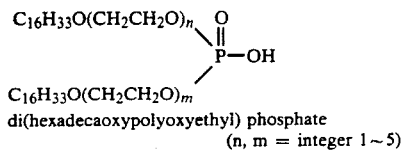
di(hexadecaoxypolyoxyethyl) phosphate
(n, m = integer 1~5)

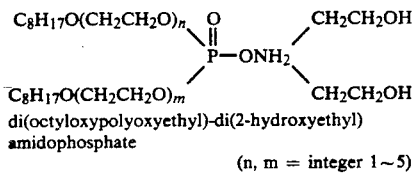
di(octyloxypolyoxyethyl)-di(2-hydroxyethyl) amidophosphate
(n, m = integer 1~5)

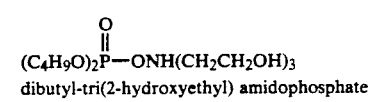
dibutyl-tri(2-hydroxyethyl) amidophosphate

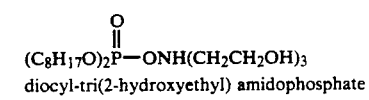
diocyl-tri(2-hydroxyethyl) amidophosphate

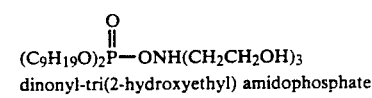
dinonyl-tri(2-hydroxyethyl) amidophosphate

-continued

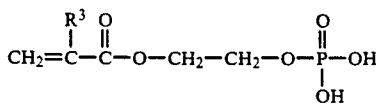
acidphosphoxyethyl (meth)acrylate

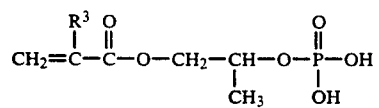
acidphosphoxypropyl (meth)acrylate

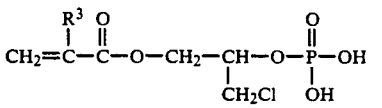
3-chloro-2-acidphosphoxypropyl (meth)acrylate

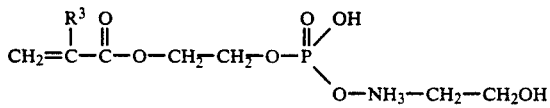
(meth)acryloyloxyethyl acidphosphate monoethanolamine halfsalt

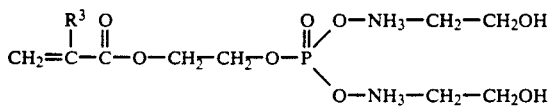
(meth)acryloyloxyethyl acidphosphate diethanolamine salt

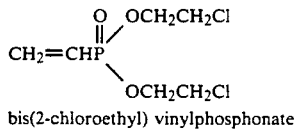
bis(2-chloroethyl) vinylphosphonate

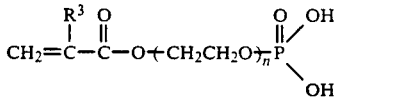
acidphosphoxy polyethylene glycol (meth)acrylate

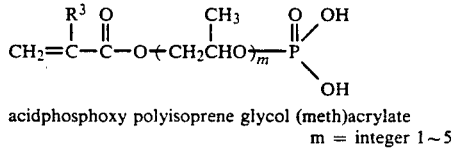
acidphosphoxy polyisoprene glycol (meth)acrylate
m = integer 1~5

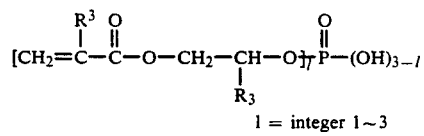
l = integer 1~3

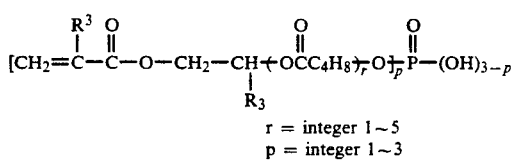
r = integer 1~5
p = integer 1~3

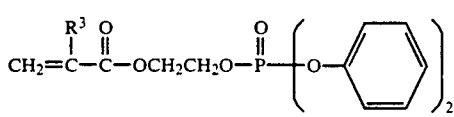
diphenyl-2(meth) acryloyloxyethyl phosphate

-continued

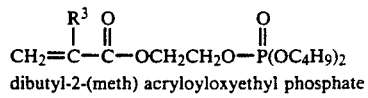
dibutyl-2-(meth) acryloyloxyethyl phosphate

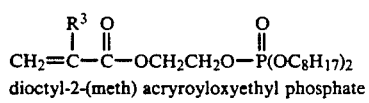
dioctyl-2-(meth) acryroyloxyethyl phosphate

Acidphosphoxyethyl (meth)acrylate, (meth)acryloyloxyethyl acidphosphate monoethanolamine half salt and dialkyl(hydroxyalkyl)amidophosphate are used preferably.

The compound represented by formula (2) is contained per 100 parts by weight of compound (A) or a mixture thereof in an amount of 0.005~25 parts by weight, preferably 0.01~20 parts by weight, more preferably 0.02~18 parts by weight. The reason is that the range provides the coated film with satisfactory antistatic properties and transparency.

In order to form a coated film by coating on the surface of a molded material composed of polyolefin a curable coating resin composition of the present invention causing the coated composition to crosslink and cure to form a film, it is necessary that a polymerization initiator is added to the composition. As to the curing methods, curing by ultra violet rays and curing by heat are usually employed. For the ultra violet curing, polymerization initiators to be added are photosensitizers, which are exemplified by benzoins or their ethers, like benzoin, benzoin methylether, benzoin ethylether, benzoin isopropylether, benzoin isobutylether; benzophenone-type compounds like benzophenone, p-chlorobenzophenone, p-methoxybenzophenone; benzil type compounds like benzil, benzil dimethylketal, benzil ethyl ketal; and hydroxyalkyl phenyl keton type compounds like 1-(4-isopropylphenyl)-2-hydroxy-2-methyl-1-propanone; 1-phenyl- 2-hydroxy-2-methyl-1-propanone, 1-(4-tert-butylphenyl)-2-hydroxy-2-methyl-1 propanone. For the curing by heat, radical initiators are added, which are exemplified by azo compounds like azobisisobutylonitrile; and peroxides like benzoyl peroxide, lauryl peroxide, di tert-butyl peroxide, dicumyl peroxide, cumene hydroxpeoxide. Further to curable coating resin compositions of the present invention are added both of photosensitizers and radical initiators, which enables a simultaneous proceeding of the ultra violet curing and thermal curing, a proceeding of the ultra violet curing firstly and then thermal curing or a proceeding of the thermal curing firstly and then ultra violet curing.

Amounts of the polymerization initiators to be added per 100 parts by weight of compound (A) or a mixture thereof are preferably in an amount of 0.01~20 parts by weight, more preferably in an amount of 0.1~10 parts by weight.

The range provides favorable curing characteristics for the curing, and cured films have superior surface hardness, resistance to scratch, resistance to abrasion, resistance to solvents and adhesion to substrates.

Curable coating resin compositions of the present invention may be a composition composed only of the aforementioned essential components, however, other additives are incorporated optionally and they include polymerization inhibitors, transparent fillers, solvents, ultra violet ray absorbers, stabilizers like antioxidants, optical whiteners, (reactive) oligomers like methyl (meth)acrylate, polyurethane acrylates, polyester acrylates, and polymers like polymethylmethacrylate. These additives are added in an appropriate amount.

Curable coating resin composition of the present invention may be incorporated when necessary with fine powdery inorganic fillers of an amount of maintaining the transparency of cured films obtained therefrom. The fine powderly inorganic filler may have any average particle size proper for powder, and usually has a size of 1 nm to 10 μm, preferably of 1.5 nm to 1 μm. For the purpose of maintaining the transparency of outer coated film, the fine powdery inorganic filler has usually a refractive index of 1.40 to 1.60, preferably of 1.42 to 1.58. The fine powdery inorganic filler is exemplified by glass powder, mica, glass beads, glass flake, diatomaceous earth, anhydrous silica, hydrated silica, silica, silica sand, quartz, kaolinite, montmorillonite, sericite, talc, chlorite, pottery stone, feldspar. Fine powdery inorganic fillers may be surface treated with an alkyl carbonic acid salt, a silane coupling agent, a titanium coupling agent, $Cl_2Si(CH_3)_2$ and an alcohol, and the treated materials are used similarly. Aqueous or alcoholic suspensions of the fine powdery inorganic fillers like colloidal silica, methanol silicasol, ethanol silicasol, isopropanol silicasol may be used. Among these fine powdery inorganic fillers, fine powdery silica is most preferred since the incorporation thereof provides outer coating films with enhanced surface hardness, resistant to scratch and resistant to abrasion without deteriorating the transparency and surface luster. Amounts of the fine powdery inorganic fillers to be added per 100 parts by weight of the aforementioned compound (A) or the mixtures thereof are 0.5~200 parts by weight, preferably 0.5~100 parts by weight, more preferably 1.0~50 parts by weight. The reason is that the coated film is improved in surface hardness, resistance to scratch and resistance to abrasion without deterioration of the transparency and surface luster.

Curable coating resin compositions of the present invention may be incorporated where necessary with solvents for improving the coating workability in addition to the afore-mentioned essential organic solvent so as to maintain the composition in a liquid state or a suspension state. The added solvent may be used for liquefying or suspension-liquefying of the composition, for adjusting viscosity of the composition or for providing improved wetting to molded materials.

Solvents used for the purpose are exemplified by hydrocarbons like benzene, toluene, xylene, cumene, ethylbenzene, hexane, heptane, octane, petroleum ether, ligroin, cyclohexane, methylcyclohexane; halogenated hydrocarbons like methylene chloride, chloroform, carbon tetrachloride, bromoform, trichlene, ethylenedichloride, perchlene, trichloro ethane, tetrachloro ethane, propylene dichloride, monochlonobenzene, monobromo benzene alcohols like methanol, ethanol, isopropanol, butanol, pentanol, hexanol, cyclohexanol, ethylene glycol, propylene glycol, glycerin, ethylene glycol monomethylether, diethylene glycol; ketones, like acetone, methyl ethyl ketone, methyl isobutyl ketone, cyclohexanone; ethers like diethyl ether, dipropyl ether, butyl ethyl ether, dibutyl ether, ethylene glycol dimethyl ether, diethylene glycol dimethyl ether; nitriles like acetonitrite, propionitrile, capronitrile; esters like methyl formate, ethyl formate, methyl acetate, ethyl acetate, propyl acetate, isobutyl acetate, butyl acetate, pentyl acetate, methyl benzoate, ethyl benzoate. Amounts of these organic solvents to be added per 100 parts by weight of compound (A) or the mixture thereof are 5~1000 parts by weight, preferably 5~300 parts by weight, more preferably 5~100 parts by weight. The range provides to the coating composition of the present invention with favorable coating workability and to coated films with improved transparency and flatness.

From compositions of the present invention containing the aforementioned essential components and various other optional additives including inorganic and organic fillers, solvents and stabilizers are prepared compositions in a solution state or a suspension state by the method described below. The above-mentioned raw material mixture is compounded, kneaded and mixed by the use of such equipments as rolls, Bumbury's mixers, ball mills, attritor, whipper, aux-mixer, dissolver, homogenizer, colloid mill, sand mill, vibrating mill, mixer, mixing-agitating tank, etc. to obtain compositions being homogeneously dissolved or dispersed. Methods for coating the liquid state composition or suspended state composition on the surface of molded polyolefin are those conventional ones including brush, spray, dip, barcoat, rollcoater, spincoater and gelcoater methods, and coated compositions are dried by natural drying, forced drying with carrier gas, thermal drying in infra red ray furnaces, far infrared rays furnaces, hot wind furnaces.

A laminated molded material is available by the curing treatment of the outer coated layer of molded material formed by coating the curable coating resin composition of the present invention.

As to curing of the dried composition to form films, polymerization-crosslinking-curing methods by irradiation of light or ultra violet rays or by heating are exemplified. Among the methods, the optical curing is conducted usually at a temperature of $-10°\sim150°$ C., preferably $5°\sim130°$ C. under irradiation of light for 1 second to 1 hour, preferably for 1 second to 10 minutes. The thermal curing method is conducted usually at a temperature of $-10°\sim150°$ C., preferably $5°\sim130°$ C. with a necessary length of time usually of 0.05~10 hours, preferably 0.1~8 hours.

For substrate materials constituting the laminated molded material, those usable include inorganic materials like glass, aluminum; acrylic resins like polymethylmethacrylate, polymethacrylate; polycarbonate; polystyrene; copolymers of ethylene with cyclic olefin as disclosed in U.S. Pat. No. 4,614,778 exemplified by a copolymer of ethylene with 1,4,5,8-dimethano-1,2,3,4,4a,5,8,8a-octahydronaphthalene (tetracyclo dodecene), a copolymer of ethylene with 2-methyl-1,4,5,8-dimethano-1,2,3,4,4a,5,5,8a-octahydronaphthalene(-methyl tetracyclo dodecene) and a copolymer of ethylene with 2-ethyl-1,4,5,8-dimethano-1,2,3,4,4a,5,8,8a-octahydronaphthalene; poly 4-methyl-a-pentene; epoxy resins; polyether sulfones; polysulfons; polyether imido; those disclosed in Japanese Application Kokai (laid open) 60-26024 like hydrogenated ring-opening polymers of tetra cyclododecenes, or norbornenes; polymer alloys obtained by mixing of same polymers or different polymers like those from polycarbonate and polystyrene.

Forms of substrate constituting the laminated molded material are any of film sheet, plate or others.

When the surface of molded substrate is coated with the curable coating resin composition of the present invention, a resin surface of the molded substrate may be subjected to washing with various solvents, washing with aqueous alkali solutions, washing with surfactants, ultrasonic washing, electrolytic washing, blast treatment, sand blast treatment, etching with acid or alkali, frame treatment, corona discharge treatment, arc discharge treatment, glow discharge treatment, plasma discharge treatment and chemical treatment. When the surface of molded substrate is to be laminated with a coated film of the molded substrate is to be laminated with a coated film of the curable coating resin composition of the present invention, an intermediate adhesive layer composed of a primer may be placed between the substrate and the coated film for the purpose of improving the adhesion between the both. Primers used usually for the purpose are modified polyolefins having grafted $\alpha,\beta$-unsaturated carboxylic acids, anhydrides thereof, esters thereof or derivatives thereof. Thus, the composition of the present invention is coated on the surface of substrate subjected optionally to surface treatments or primer treatments, and cured in accordance with the method mentioned above.

Molded materials having a laminated film of the curable coating resin composition of the present invention are used for various applications, which are exemplified as follows: light intaking plates; sky domes; panel plates for solar water heater; panel plates for globe box; watch glass; lenses for glasses, camera, contact lens; optical prism; optical disks; blood bags; shower domes and coffee vessels for coffee marker; water tanks; cover for lighting equipment; covers for stereo equipments; name plates and covers of meters; cover for car lamps; level sensors; films for prevention of glass scattering; films for mold releasing; insulating films; films for agricultural uses; optical disks; sight glasses for various equipments, such as clothing dryer, washing machine, hair dryer, oil tank; wind sealing glasses for cars such as motorcycle, jeep, motorboat; window glasses, for cars (front window, rear window, opera window, triangle wind, sunroof glasses) etc.; wind glass for greenhouse, house, water tank; mirrors; vessels like bottles such as soy sauce bottle, lotion or make up bottle; relay cases; fuse boxes; side covers and dust seals for motorcycles; fencers; curtains; screens; table clothes; water proof films; water proof sheets; insulating films; floor tiles; floor sheets; doors; table plates; wall tiles; counter top decorative plates; chopping boards; wall sheets; wall papers; furniture; light weight wall plates; dinner wear; chairs; bath tubs; chamber pots; refrigerators; wall panels; water pipes; piping tubes; ducts; curtain rods; gutters; insulating materials; water proof materials for coated film; curtains; window frames; car wheels; various vessels; interior materials for car; toilet tables; flower boxes; particle boards; roof tiles; sliding doors; shutters; water proof van; pipes; wiring materials; gear cam; knobs; frames for valve; fans; inside panels; bumpers; brakes. Other than the above, domestic electric goods, motorcar parts, motorcycle parts, automat parts, civil engineering materials, general industrial materials, office information machines, electronic parts, packaging materials, sporting goods, medical equipment and atomic energy related parts can use the molded materials.

A preferable example of molded materials laminated with a coated film of the curable coating resin composition of the present invention is the information recording medium of the present invention. The information recording medium has at least one surface coated with the curable coating resin composition of the present invention, which constitutes a over-coat and/or a top-coat of the recording medium. The information recording medium may have a layer of resin inside of the surface layer formed with the curable coating resin composition for the purpose of improving adhesion of the surface layer and/or another layer. A preferable embodiment will be explained hereunder by reference to drawings.

FIG. 1 is a schematic diagram showing the constitution of optical disk 1. The optical disk 1 is composed of substrate 2, recording pit 3 for recording or reproduction, reflecting layer 4, surface layer 6 as an over-coat and top-coat 8 on the other side of substrate 2 for protection. The reflecting layer 4 serves as a protective layer and an enhancing layer, and a multi-layered construction may intensify the reflecting ratio.

Figure 2:
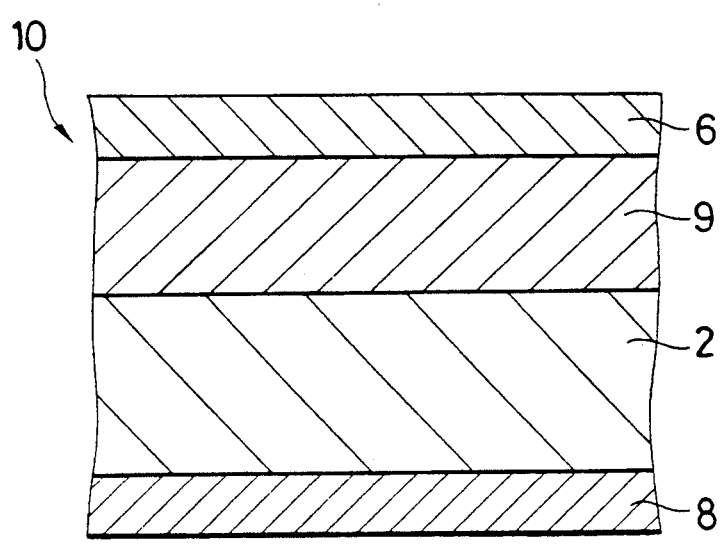

FIG. 2 is a schematic diagram showing the constitution of opto-magnetic disk 10. The opto-magnetic disk 10 is composed of substrate 2, recording layer 9 for recording or reproduction, surface layer 6 as an overcoat and top-coat 8 on the other side of substrate 2 for protection.

Figure 3:
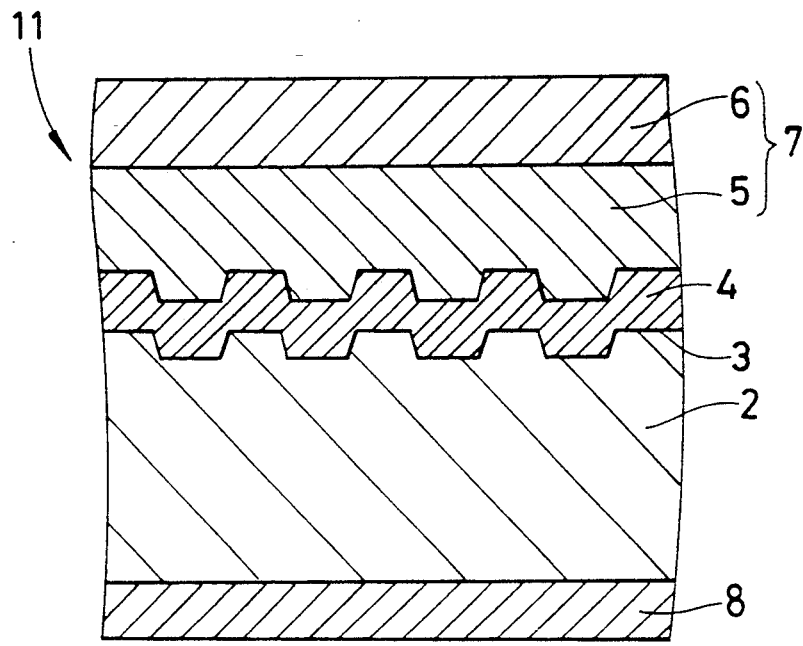

FIG. 3 is a schematic diagram showing constitution of optical disk 11. The optical disk 11 has transparent substrate 2, recording pit 3 for recording or reproduction, reflecting layer 4 and protective layer 7 as a overcoat. The protective layer 7 is composed of at least two layers including inner layer 5 of an adhesive resin layer and surface layer 6. Top-coat 8 protects the other side of substrate 2.

Figure 4:
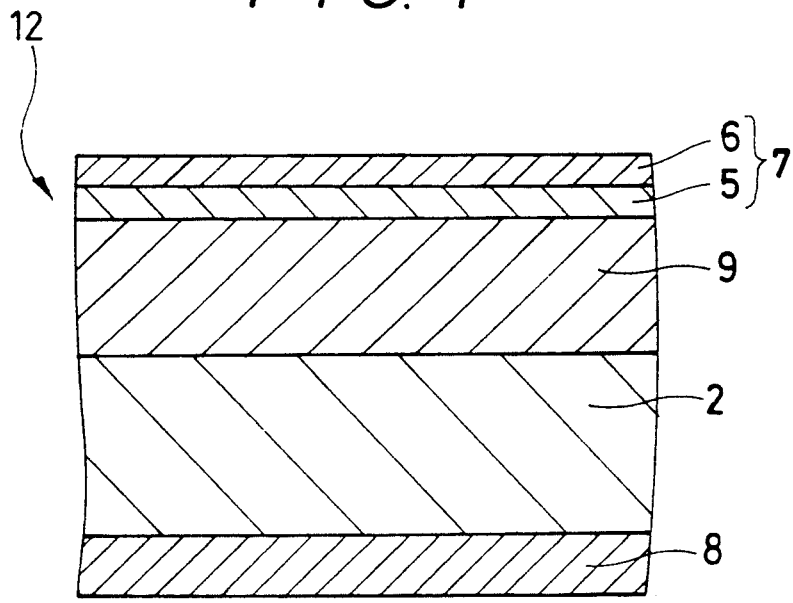

FIG. 4 is a schematic diagram showing constitution of another opto-magnetic disk 12. The opto-magnetic disk 12 has substrate 2, recording layer 9 for recording or reproduction and protective layer 7 as a over-coat. Protective layer 7 is composed of at least two layers including inner layer 5 of an adhesive resin layer and surface layer 6 being coated with a curable coating resin composition of the present invention. Top-coat 8 protects the other side of substrate 2.

In the present invention, at least one side of the outer surface of information recording medium is characteristically coated with the curable coating resin composition of the present invention. The coated surface is allowable to be either surface (overcoat) layer 6 or top-coat 8. For enhancing resistance to CSS, the information recording medium is preferably intended to reduce contact area between the head and medium surface and to ease floating of the head by means of texture treatments of surface with a file or inclusion of fine particles in the surface layer.

In the information recording medium of the present invention, substrate 2 may be molded in any form including film sheet, card, plate or round plate. Typically, it is formed in 3.5 inch disk, 5.25 inch disk, 8 inch disk, 64 mm diameter disk, etc., however, optical cards, floptical disks, etc. may be included.

When at least one side of the surface is coated with the aforementioned composition, at least one side of the surface or the surface of the recording layer or reflecting layer to be coated is optionally treated as mentioned previously or treated with a primer prior to the coating. Thereafter, the surface is coated with the composition and then cured.

The recording and/or reproducing portion constituting the present invention is a magnetic layer in magnetic recording media, and is a plastic portion or $SiO_2$ layer forming a recording pit in optical recording media. In magnetic recording media, the recording layer is exemplified as following by a opto-magnetic recording layer having an anisotropy recording layer directed vertically to the layer surface. The recording layer is preferably composed of either (i) at least one element selected from 3d transition metals, and (iii) at least one element selected from rare earth elements; or (i) at least one element selected from 3d transition metals, and (ii) a corrosion resistant metal, and (iii) at least one element selected from rare earth elements. (i) As to 3d transition metals, Fe, Co, Ti, V, Cr, Mn, Ni, Cu, Zn are mentioned, in which Fe and/or Co are preferred. (ii) Corrosion resistant metals can enhance antioxidation properties of the opto-magnetic recording layer by the incorporation. These corrosion resistant metals include Pt, Pd, Ti, Zr, Ta, Mo, Nb, Hf, Cr, in which Pt, Pd and Ti are preferred, and Pt and/or Pd are more preferred. (iii) As to rare earth metals, Gd, Tb, Dy, Ho, Er, Tm, Yb, Lu, La, Ce, Pr, Nd, Pm, Sm, Eu are mentioned, in which Gd, Tb, Dy, Ho, Nd, Sm, Pr are preferred. In opto-magnetic recording layer, (i) 3d transition metal of an amount of 30–85, preferably 40–70% by atom, (ii) corrosion resistant metal of up to 30, preferably 5–25% by atom, and (iii) rare earth metal of 5–50, preferably 25–45% by atom, exist preferably.

For a phase-transition type recording layer, it is composed of, for example, with a thin film of Te-prime alloy, Se-prime alloy, Te-Ge-Sb alloy, In-Sb-Te alloy, Se-Ge-Cr alloy, Te-Ge-Zn alloy. Recording layers capable of recording only once (additional writing type recording layer) have a film of Te-C-H, Te-Cr-C-H or Te-Ag alloy. For these recording layers, organic coloring materials like polymethine compounds, cyanin compounds may be used also for the recording layer.

In the recording media of the present invention, in addition to the substrate, recording and/or reproduction portions, such other layers may be installed optionally between the surface coating and recording and/or reproduction portion a reflecting layer of Al, Ni alloys; a protective layer composed of inorganic compounds likes $Si_3N_4$, $SiN_x(o<x<4/3)$, Al, Au, Zn Se, ZnS, Si, $SiO_2.ZrO_2$, Cr, CdS; and enhancing layer; and a protective layer composed of organic compounds like ultra violet rays radiation curable acrylic resins. Further, an enhancing layer composed of inorganic compounds like $Si_3N_4$, $SiN_x(o<x<4/3)$, Al, Au, Zn Se, ZnS, Si, $SiO_2.ZrO_2$, Cr, CdS may be installed between the substrate and recording and/or reproducing portion.

When an adhesive resin layer is placed inside of the surface layer composed of the curable coating resin composition, the resin layer must adhere to another resin or metal layers (Al, Al alloy, Ni alloy, etc). In the present invention, the resin has preferably a high adhesion to Al of not to be peeled by the cross-cut test. Resins of highly adhesive to metals includes acrylate resins, methacrylate resins, polyimido resins, epoxy resins. Commercially available ultra violet rays radiation curable resins like DAICURE CLEAR SD-101, DAICURE CLEAR SD-301 (Product names of Dainippon Ink and Chemicals Inc.) are usable, though other resins adhesive to metals may be used.

When protective layers 7 are composed of a surface layer 6 and an inner layer 5, the thickness of surface layer 6 is 0.01~20 μm, preferably 0.02~20 μm, and that of inner layer 5 is 0.01~30 μm, preferably 0.02~20 μm.

The protective layer 7 is not necessarily composed of two layers but may have other layers like antistatic layers, primer layers, etc. For the primer layers, modified polyolefins having grafted α,β-unsaturated carboxylic acids, anhydrides thereof, esters thereof or derivatives thereof may usually employed.

For forming on a substrate a protective layer 7 composed of at least two layes, the surface of recording layer or reflecting layer to be coated is subjected to surface treatments like washing with various solvents, washing with aqueous alkali solutions, washing with surfactants, ultrasonic washing, electrolytic washing, blast treatment, said blast treatment, etching with acid or alkali, frame treatment, corona discharge treatment, arc discharge treatment, glow discharge treatment, plasma discharge treatment and chemical treatment. On the treated surface, an adhesive resin is coated to form the inner layer, and then the surface layer is formed by coating and curing.

The composition of the present invention comprises the specified monomer component, the specified solvent, the specified phosphine compound and a polymerization initiator. The composition shows satisfactory curing under atmosphere, superior adhesion to molded materials like resin, etc. without heat treatments when coated on the surface of molded inorganic or organic materials and cured. The cured coating is superior in surface hardness, resistance to scratch, resistance to abrasion, surface luster, transparency and antistatic properties.

The information recording medium of the present invention has a surface coating which is superior in curing under atmosphere, adheres strongly to resins, metals, glass, etc., shows the adhesion without heat treatments, and superior in surface hardness, resistance to scratch, resistance to abrasion and antistatic properties. The medium is useful for magnetic recording media, optical recording media and opto-magnetic recording media. Further, the information recording media having a protective layer on the surface which is composed of at least two layers has an inner surface layer of satisfactory adhesion to other layers of resin, metal, etc., and an outer surface layer of superior in surface hardness, resistance to scratch, resistance to abrasion and antistatic properties.

PREFERRED EMBODIMENTS

The present invention will be explained in detailed by reference to the following Examples, which are intended to illustrate but not limit the subject matter of the present invention.

The evaluation was conducted by the following methods.

(1) Haze

Measured in accordance with the method of ASTM D-1003.

(2) Pencil Hardness

Measured in accordance with the Method of JIS K-5651.

(3) Adherence

Tested with a cross-cut test in accordance with the method JIS K-5400-1979. The test result was indicated with numbers of cross-cut left adhered in 100 cuts.

(4) Surface Resistivity

Measured in accordance with the method of ASTM D-257-78.

(5) Resistance to Humidity

A specimen was stored for 100 hours in a chamber kept at 60° C. and 85% relative humidity. After the storage, the specimen was allowed to cool to room temperature, and the measurements for haze, adherence and surface resistivity were conducted.

EXAMPLE 1

Into a 1 liter reaction vessel were charged 223 g (1 mol eq.) of isophorone diisocyanate, 0.05 g of dibutyltin laureate and 300 g of trimethylolpropane triacrylate. To the charge was added dropwisely from a dropping funnel during 30 minutes 232 g (2 mol eq.) of 2-hydroxyethyl acrylate and allowed to react at 85° C. under nitrogen gas atmosphere. After continuing the reaction for 1 hour, a viscous urethane-acrylate compound (A) was obtained. Into a vessel equipped with an agitator were charged 350 g of urethane-acrylate (A), 10 g of benzoin ethyl ether, 150 g of toluene, 150 g of ethylacetate, 350 g of isobutylalcohol and 3 g of didecyl-di (2-hydroxyethyl) amidophosphate, and the charge was mixed to become a homogeneous mixture named as Sample 1.

On the cleaned surface of a molded transparent amorphous polyolefin (ethylene-tetracyclododecene random copolymer) plate was dropped about 5 cc of the above-stated coating composition (Sample 1), and was coated with a spincoater. Being kept at room temperature for 5 minutes, the coated composition was cured with radiation energy of about 28000 mJ/cm$^2$ using a UV radiation equipment.

Physical properties of the obtained cured film are shown in Table 1.

EXAMPLE 2

Into a 1 liter reaction vessel were charged 223 g (1 mol eq.) of isophorone diisocyanate, 0.05 g of dibutyltin laureate and 300 g of trimethylolpropane triacrylate. To the charge was added dropwisely from a dropping funnel during 30 minutes 600 g (2 mol eq.) of pentaerythritoltriacrylate and allowed to react at 85° C. under nitrogen gas atmosphere. After continuing the reaction for 1 hour, a viscous urethane-acrylate compound (B) was obtained. Into a vessel equipped with an agitator were charged 350 g of urethane-acrylate (B), 10 g of diethoxyacetophenone, 150 g of xylene, 150 g of butylacetate, 350 g of isopropylalcohol and 1.4 g of methacryloyloxyethyl acidphosphate, and the charge was mixed to become a homogeneous mixture named as Sample 2. A cured film of Sample 2 prepared in the same manner as Example 1 was evaluated for the physical properties. The result is shown in Table 1.

EXAMPLE 3

Into a vessel equipped with an agitator were charged 180 g of dipentaerythritol hexa-acrylate, 20 g of hydroxyethyl acrylate, 10 g of 1-phenyl-2-hydroxy-2-methyl-propane-1-one, 100 g of toluene, 150 g of xylene, 100 g of diacetonealcohol, 450 g of isopropylalcohol and 18 g of acidphosphoxyethyl acrylate, and the charge was mixed to become a homogenous mixture named as Sample 3.

A cured film of Sample 3 prepared in the same manner as Example 1 was evaluated for the physical properties. The result is shown in Table 1.

EXAMPLE 4

Into a vessel equipped with an agitator were charged 330 g of ethyleneoxide-modified bisphenol-A diacrylate (BP-4EA; Kyoeisha Yushikagaku Co.), 20 g of N-vinylpyrrolidone, 100 g of toluene, 100 g of ethylacetate, 350 g of isobutylalcohol, 100 g of 2-methoxymethanol, 2 g of t-butylhydroperoxide, 3 g of 1-hydroxycyclohexyl phenyl ketone and 15 g of acidphosphoxypropyl methacrylate, and the charge was mixed to become a homogenous mixture named as Sample 4.

A cured film of Sample 4 prepared in the same manner as Example 1 was evaluated for the physical properties. The result is shown in Table 1.

COMPARATIVE EXAMPLE 1

Into a vessel equipped with an agitator were charged 350 g of urethane-acrylate compound (A) prepared by the method of Example 1, 10 g of benzoinethylether, 150 g of toluene, 150 g of ethylacetate and 350 g of isobutylalcohol, and the charge was mixed to become a homogenous mixture named as Comparative Sample 1.

A cured film of Comparative Sample 1 prepared in the same manner as Example 1 was evaluated for the physical properties. The result is shown in Table 1.

EXAMPLES 5~8

Samples were prepared in the same manner as Example 1 with the exception that the compound mentioned in Table 2 was used in place of didecyl-di(2-hydroxyethyl) amidophosphate, and were evaluated. The result is shown in Table 2.

TABLE 1

|  | Ex. 1 | Ex. 2 | Ex. 3 | Ex. 4 | CEx. 1 |
|---|---|---|---|---|---|
| Curable Coating Composition |  |  |  |  |  |
| (C) Kind of Compound* | P-1 | P-2 | P-3 | P-4 | none |
| Amount used (Part, wt) | 0.3 | 1.4 | 18 | 15 | none |
| Physical Properties of Cured Film |  |  |  |  |  |
| Haze (%) | 1.5 | 2.0 | 1.5 | 1.5 | 1.0 |
| Pencil Hardness | 2H | 2H | H | H | 2H |
| Adherence (×/100) | 100 | 100 | 100 | 100 | 100 |
| Surface Resistivity (Ω/cm$^2$) | $2 \times 10^{10}$ | $9 \times 10^9$ | $7 \times 10^{10}$ | $10^{11}$ | $>10^{13}$ |
| Resistance to Humidity |  |  |  |  |  |
| Haze (%) | 1.5 | 4.0 | 2.0 | 2.0 | 1.0 |
| Adherence (×/100) | 100 | 100 | 100 | 100 | 100 |
| Surface Resistivity | $2 \times 10^{11}$ | $10^{12}$ | $7 \times 10^{12}$ | $10^{13}$ | $>10^{13}$ |

TABLE 1-continued

|  | Ex. 1 | Ex. 2 | Ex. 3 | Ex. 4 | CEx. 1 |
|---|---|---|---|---|---|
| ($\Omega/cm^2$) |  |  |  |  |  |

*P-1 didecyl-di(2-hydroxyethyl)amidophosphate $$C_{10}H_{21}O\text{-}P(=O)(ONH_2)(\text{-}OCH_2CH_2OH)_2 \text{ with } C_{10}H_{21}O$$

P-2 acryloyloxyethyl acidphosphate monoethanolamine halfsalt $$CH_2=C(CH_3)\text{-}C(=O)\text{-}CH_2\text{-}CH_2\text{-}OP(=O)(OH)(ONH_3CH_2CH_2OH)$$

P-3 acidphosphoxyethyl acrylate $$CH_2=CHCOCH_2CH_2OP(=O)(OH)(OH)$$

P-4 acidphosphoxypropyl methacrylate $$CH_2=C(CH_3)\text{-}C(=O)\text{-}OCH_2CHOP(=O)(OH)(OH) \text{ with } CH_3$$

TABLE 2

|  | Ex. 5 | Ex. 6 | Ex. 7 | Ex. 8 |
|---|---|---|---|---|
| Curable Coating Composition |  |  |  |  |
| (C) Kind of Compound* | P-5 | P-6 | P-7 | P-8 |
| Amount used (Part, wt) | 0.45 | 1.5 | 0.2 | 0.22 |
| Physical Properties of Cured Film |  |  |  |  |
| Haze (%) | 1.5 | 1.5 | 1.5 | 1.5 |
| Pencil Hardness | 2H | 2H | 2H | 2H |
| Adherence (×/100) | 100 | 100 | 100 | 100 |
| Surface Resistivity ($\Omega/cm^2$) | $2 \times 10^{10}$ | $10^{10}$ | $10^{11}$ | $3 \times 10^{10}$ |
| Resistance to Humidity |  |  |  |  |
| Haze (%) | 2.0 | 2.0 | 2.0 | 2.0 |
| Adherence (×/100) | 100 | 100 | 100 | 100 |
| Surface Resistivity ($\Omega/cm^2$) | $10^{12}$ | $7 \times 10^{11}$ | $10^{13}$ | $10^{12}$ |

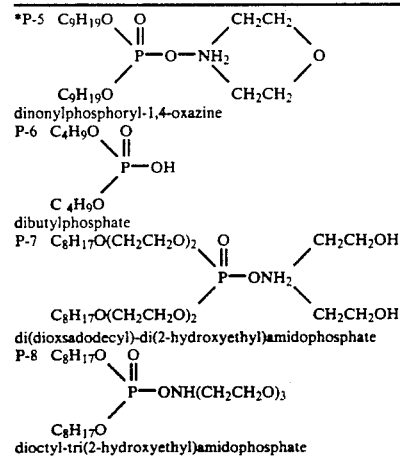

*P-5 dinonylphosphoryl-1,4-oxazine

P-6 dibutylphosphate

P-7 di(dioxsadodecyl)-di(2-hydroxyethyl)amidophosphate

P-8 dioctyl-tri(2-hydroxyethyl)amidophosphate

EXAMPLE 9

On a transparent amorphous polyolefin (ethylene-tetracyclododecene random copolymer) substrate disc of 3.5 inch diameter having grooves of 6 μm pitch, a thin film was formed by the spattering method. The film formed was;

Silicon nitride 0.13 μm/TbFeCo 0.025 μm/Silicon nitride 0.03 μm/Al alloy 0.15 μm.

On the film, the coating composition of Examples 1-8 was coated with a spincoater to obtain a coated composition having 1 μm thickness. The coated composition was allowed to stand at room temperature for 5 minutes, and was cured by irradiating 28000 mJ/cm² UV rays radiation. The obtained disk was evaluated for the CSS resistance under the following conditions.

CSS Experiment conditions;
Floating length=0.2 μm
Rotation of disk=3600 rpm
Measuring position=at the point of disk radius 25 mm
Repeat (Rotation start, stop) cycle=10 sec.
Experiment circumstances=clean room of class 1000, 23° C., 50% RH.
CSS Experiment result;
No change was found on the disk and head after 30000 times CSS.

EXAMPLE 10

On a transparent amorphous polyolefin (ethylene-tetracyclododecene random copolymer) substrate disc of 3.5 inch diameter having grooves of 6 μm pitch, a thin film was formed by the spattering method. The film formed was;

Silicon nitride 0.13 μm/TbFeCo 0.025 μm/Silicon nitride 0.03 μm/Al alloy 0.15 μm.

On the film a UV radiation curable resin DAICURE CLEAR SD-101 (Product name of Dainippon Ink Kagaku Co.) was coated with a spincoat method to have a coating of 1.5 μm thickness. The coated resin was cured by irradiating about 28000 mJ/cm² UV rays radiation. On the cured resin film the coating composition of Examples 1-8 was coated with a spincoater to obtain a coated composition having 1 μm thickness. The coated composition was allowed to stand at room temperature for 5 minutes, and was cured by irradiating about 28000 mJ/cm² UV rays radiation. The coated surface of the disk was subjected to a texture treatment of circumference direction by use of a wrapping tape (A 8000; Fuji Film Co.). The treated disk was evaluated for the CSS resistance under the following condition.

CSS Experiment conditions;
Floating length=0.2 μm
Rotation of disk=3600 rpm
Measuring position=at the point of disk radius 25 mm
Repeat (Rotation start, stop) cycle=10 sec.
Experiment circumstances=clean room of class 1000, 23° C., 50% RH
CSS Experiment result
No change was found on the disk and head after $1 \times 10^6$ times CSS.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A curable resin coating composition consisting essentially of:
   (A) at least one urethane meth(acrylate);
   (B) 5 to 1,500 parts by weight per 100 parts by weight component (A) of an organic solvent comprising an alcoholic organic solvent, said alcoholic organic solvent comprising at least 40% by weight of said organic solvent;

(C) 0.005 to 25 parts by weight per 100 parts by weight component (A) of a compound having at least one pentavalent phosphor-containing phosphoryl group represented by the formula:

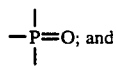 (1)

and (D) 0.01 to 20 parts by weight per 100 parts by weight component (A) of a polymerization initiator.

2. The curable resin coating composition according to claim 1, wherein the amount of component (C) is in the range of from 0.0005 to 1.5 parts by weight per 100 parts by weight component (A).

3. The curable resin coating composition according to claim 1, wherein said phosphoryl group-containing compound (C) is represented by the formula:

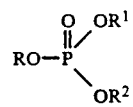 (2)

wherein R, $R^1$ and $R^2$ are selected from the group consisting of a hydrogen atom, an optionally branched, $C_1$-$C_{24}$ alkyl group, an aryl group and an aralkyl group; provided that
　(i) at least one of R, $R^1$ and $R^2$ is not hydrogen; and
　(ii) when at least one of R, $R^1$ and $R^2$ is hydrogen, the phosphoryl group-containing compound may be in the form of a salt with a compound containing at least one member selected from the group consisting of primary, secondary, and tertiary amino groups.

4. The curable resin coating composition according to claim 1, wherein said phosphoryl group-containing compound (C) is at least one member selected from the group consisting of acidphosphoxyethyl (meth)acrylates, (meth)acryloyloxyethyl acidphosphate monoethanolamine salts and dialkyl (hydroxyalkyl)amidophosphates.

* * * * *